United States Patent
Lin et al.

(10) Patent No.: US 12,157,289 B2
(45) Date of Patent: *Dec. 3, 2024

(54) SEALS FOR OPTICAL COMPONENTS

(71) Applicant: Apple Inc., Cupertino, CA (US)

(72) Inventors: Wei Lin, Santa Clara, CA (US); Boyi Fu, San Jose, CA (US); Nathan K Gupta, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,522

(22) Filed: Aug. 29, 2023

(65) Prior Publication Data

US 2024/0092065 A1    Mar. 21, 2024

Related U.S. Application Data

(60) Provisional application No. 63/407,504, filed on Sep. 16, 2022.

(51) Int. Cl.
  *B32B 17/06*  (2006.01)
  *B32B 17/10*  (2006.01)

(52) U.S. Cl.
  CPC .. *B32B 17/10302* (2013.01); *B32B 17/10036* (2013.01); *B32B 17/1022* (2013.01); *B32B 17/1077* (2013.01); *B32B 2457/00* (2013.01); *B32B 2551/00* (2013.01)

(58) Field of Classification Search
  CPC ............... B32B 17/06; B32B 17/1022; B32B 17/10036; B32B 2457/00; B32B 2551/00
  See application file for complete search history.

(56) References Cited

U.S. PATENT DOCUMENTS

| | | |
|---|---|---|
| 6,160,645 A | 12/2000 | Chandross et al. |
| 2005/0083577 A1 | 4/2005 | Varaprasad et al. |
| 2006/0215266 A1 | 9/2006 | Uehara et al. |
| 2018/0045990 A1 | 2/2018 | Wada et al. |
| 2018/0057721 A1 | 3/2018 | Krishnan et al. |
| 2020/0348453 A1 | 11/2020 | Kim et al. |
| 2023/0382085 A1* | 11/2023 | Beiley .................... C03C 27/10 |

FOREIGN PATENT DOCUMENTS

EP          2678145 B1    4/2021

* cited by examiner

*Primary Examiner* — Elizabeth E Mulvaney
(74) *Attorney, Agent, or Firm* — Treyz Law Group, P.C.; David K. Cole

(57) ABSTRACT

An electronic device may have optical components that each have first and second transparent layers such as first and second glass layers. The glass layers may have outer surfaces that face away from each other and inner surfaces that face towards each other. A polymer layer is formed between the inner surfaces of the glass layers. Along the periphery of each optical component, a hermetic seal is formed to protect the polymer material of the polymer layer. The seal may include one or more metal layers that are coupled to the first and second glass layers. For example, glass prism rings may be coupled to the first and second glass layers and metal may be coupled to the prism rings. The one or more metal layers may then be bonded to the metal on the prism rings, such as through soldering.

30 Claims, 16 Drawing Sheets

SEALS FOR OPTICAL COMPONENTS

This application claims the benefit of U.S. provisional patent application No. 63/407,504, filed Sep. 16, 2022, which is hereby incorporated by reference herein in its entirety.

FIELD

This relates generally to electronic devices, and, more particularly, electronic devices with optical components.

BACKGROUND

Electronic devices may have optical components. For example, electronic devices may have waveguides and other structures that are formed from transparent materials. These materials may be susceptible to chemical or moisture-induced degradation if exposed to excess moisture. Additionally, these materials may contain volatile species which induce degradation if they leave the system.

SUMMARY

An electronic device may have a support structure that supports one or more optical components. Each optical component may have first and second transparent layers such as first and second glass layers. The glass layers may have outer surfaces that face away from each other and inner surfaces that face towards each other. A moisture-sensitive polymer layer (e.g., an organic polymer layer) may be formed between the inner surfaces of the glass layers.

Along the periphery of each optical component, a moisture barrier may be formed to protect the polymer material of the polymer layer. The moisture barrier may be supported by a buffer member, and desiccant material may be formed adjacent to the moisture barrier to provide additional protection to water ingress.

The moisture barrier may provide a hermetic seal that extends between the first and second glass layers. The seal may include one or more metal layers that are coupled to the first and second glass layers. For example, glass prism rings may be coupled to the first and second glass layers (e.g., through welding) and metal may be coupled to the prism rings. The one or more metal layers may then be bonded to the metal on the prism rings, such as through soldering, to seal the metal layers to the first and second glass layers.

Additionally or alternatively, dark deposition layers may be used. The dark deposition layers may be attached to the glass layers and may prevent stray light from scattering through the optical component.

DETAILED DESCRIPTION

An electronic device may have housing structures. The housing structures, which may sometimes be referred to as support structures, may be used to support and/or enclose device components such as batteries, displays, integrated circuits, sensors, other circuitry, and optical components. Examples of optical components that may be used in the electronic device include lenses and lenses with embedded waveguides, optical devices with sensitive coatings, displays such as liquid crystal displays (e.g., displays in which arrays of liquid crystal pixels are sandwiched between inner and outer glass layers and polarizers), organic light-emitting diode displays (e.g., displays with organic light-emitting diode pixels sandwiched between glass layers or other layers), and/or other optical elements. The housing structures of the device may be configured to be mounted on a stand or in a frame, may be configured to rest on a desktop or other surface, or may be configured to be worn on a body part of a user (e.g., a wrist, arm, head, or other body part). During operation, an electronic device may use sensors and other circuitry to gather user input and other data and may use displays and other output devices to provide output for a user.

Figure 1:
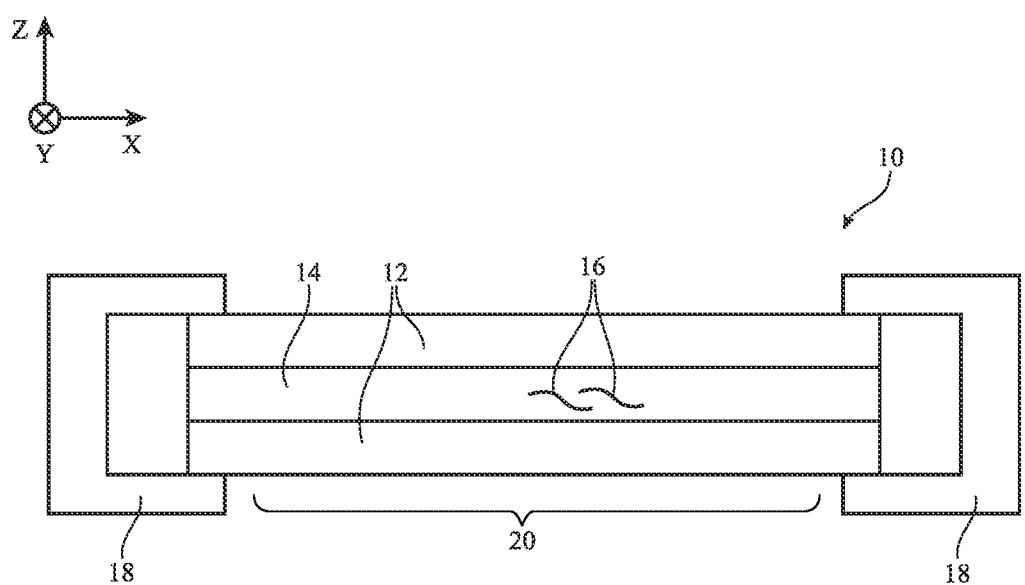
FIG. 1 is a cross-sectional side view of an illustrative electronic device in accordance with some embodiments.

A cross-sectional view of a portion of an illustrative electronic device is shown in FIG. 1. As shown in FIG. 1, electronic device 10 may have one or more optical components (sometimes referred to as optical elements) such as optical component 20. Each optical component 20 may be supported by housing 18. Housing 18 may be a wearable housing or other suitable housing. Housing 18 may be formed from polymer, metal, and/or other suitable materials. Housing 18 may have one or more portions that are attached to optical component 20 to support optical component 20 during use of device 10 by a user.

In the example of FIG. 1, optical component 20 has a layer of polymer (e.g., a polyurethane-based polymer or other polymer) such as polymer layer 14. Layer 14 may be sandwiched between a first transparent substrate (layer) 12 and an opposing second transparent substrate (layer) 12. Substrates 12 may be transparent layers that each have an outwardly facing surface and an inwardly facing surface. The outwardly facing surfaces of substrates 12 may face away from each other. The inwardly facing surfaces of substrates 12 may face each other. In some embodiments, pixels or other structures may be sandwiched between substrates 12. Illustrative configurations in which a polymer layer such as layer 14 is sandwiched between substrates 12 are sometimes described as an example.

Substrates 12 may be formed from glass (e.g., strengthened glass, ceramic glass, high index of refraction glass, and/or other layers of glass), transparent crystalline material such as sapphire, transparent ceramic, transparent polymer, and/or other transparent substrate material. In an illustrative configuration, which may sometimes be described herein as an example, substrates 12 are glass substrates (sometimes referred to as glass layers or glass members). The inner and outer surfaces of each substrate 12 may have planar areas (e.g., areas that lie in the X-Y plane of FIG. 1) and/or may have areas characterized by curved cross-sectional profiles (e.g., convex and/or concave areas). In an illustrative configuration, the outwardly facing surface of one of substrates 12 may be fully or partly convex whereas the outwardly facing surface of the other of substrates 12 may be fully or partly concave. Substrates 12 may be coated with one or more layers of optical coatings to alter their reflectance spectra, absorption spectra, and/or transmission spectra.

Optical component 20 may serve as a lens that passes light (e.g., light traveling along the Z axis of FIG. 1). The lens may form a waveguide that transports image light from a display (e.g., image light may be transported within the waveguide along a direction lying in the X-Y plane in the example of FIG. 1). During fabrication of optical component 20, polymer layer 14 may be processed to form structures for displays or other optical structures such as optical structure 16.

Polymer layer 14 may be sensitive to water. To prevent degradation of polymer layer 14 and structure 16 due to exposure to moisture in the environment, layer 14 may be hermetically sealed. In particular, the periphery of optical component 20 may be provided with a hermetic seal. The hermetic seal may prevent ingress of environmental contamination into layer 14 and may prevent egress of volatile compounds and/or moisture from layer 14 to the exterior region surrounding component 20, thereby helping to prevent degradation to layer 14. An illustrative seal, such as a hermetic seal, is shown in FIG. 2.

Figure 2:
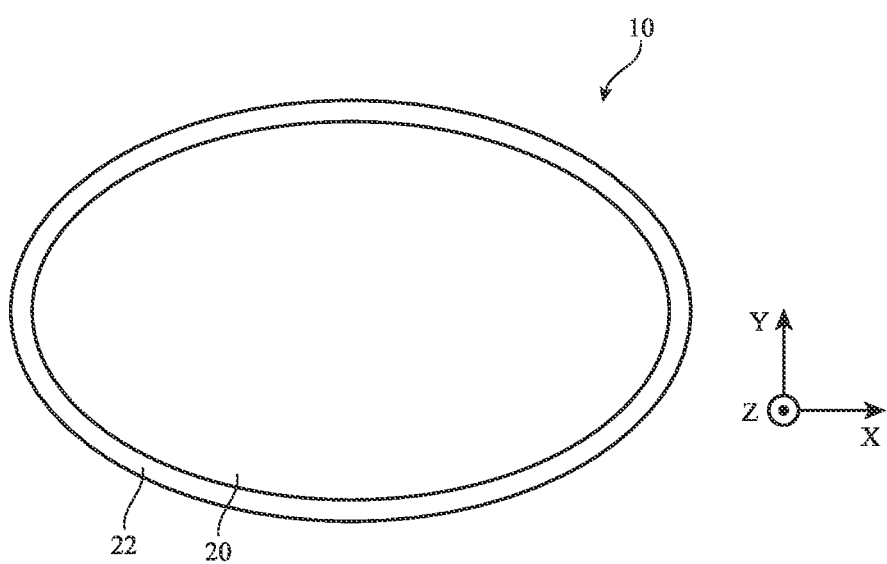
FIG. 2 is a front view of an illustrative optical component with a peripheral seal in accordance with some embodiments.

As shown in FIG. 2, seal 22 may run along the periphery of element 20 to prevent moisture ingress at any location on the edge of element 20. Element 20 of FIG. 2 has an oval footprint, but may, in general, have any suitable shape (e.g., a rectangular outline, a circular outline, a teardrop outline, an outline with a combination of straight and curved peripheral edges, and/or other suitable shape). Seal 22, which may sometimes be referred to as a moisture barrier seal or moisture seal, may be formed from one or more barrier layers that are impervious to moisture and/or other structures that provide structural support, adhesion, seam sealing, etc. Seal 22 may, for example, be formed from one or more metal layers that are coupled to the upper and lower transparent layers (e.g., glass layers) of FIG. 1. To seal the one or more metal layers to element 20, additional glass layers (e.g., prisms) may be provided on the upper and lower transparent layers, metal may be sputtered on the additional glass layers, and the one or more metal layers may be soldered to the sputtered metal. An example of an illustrative seal coupled to an optical element is shown in FIG. 3.

Figure 3:
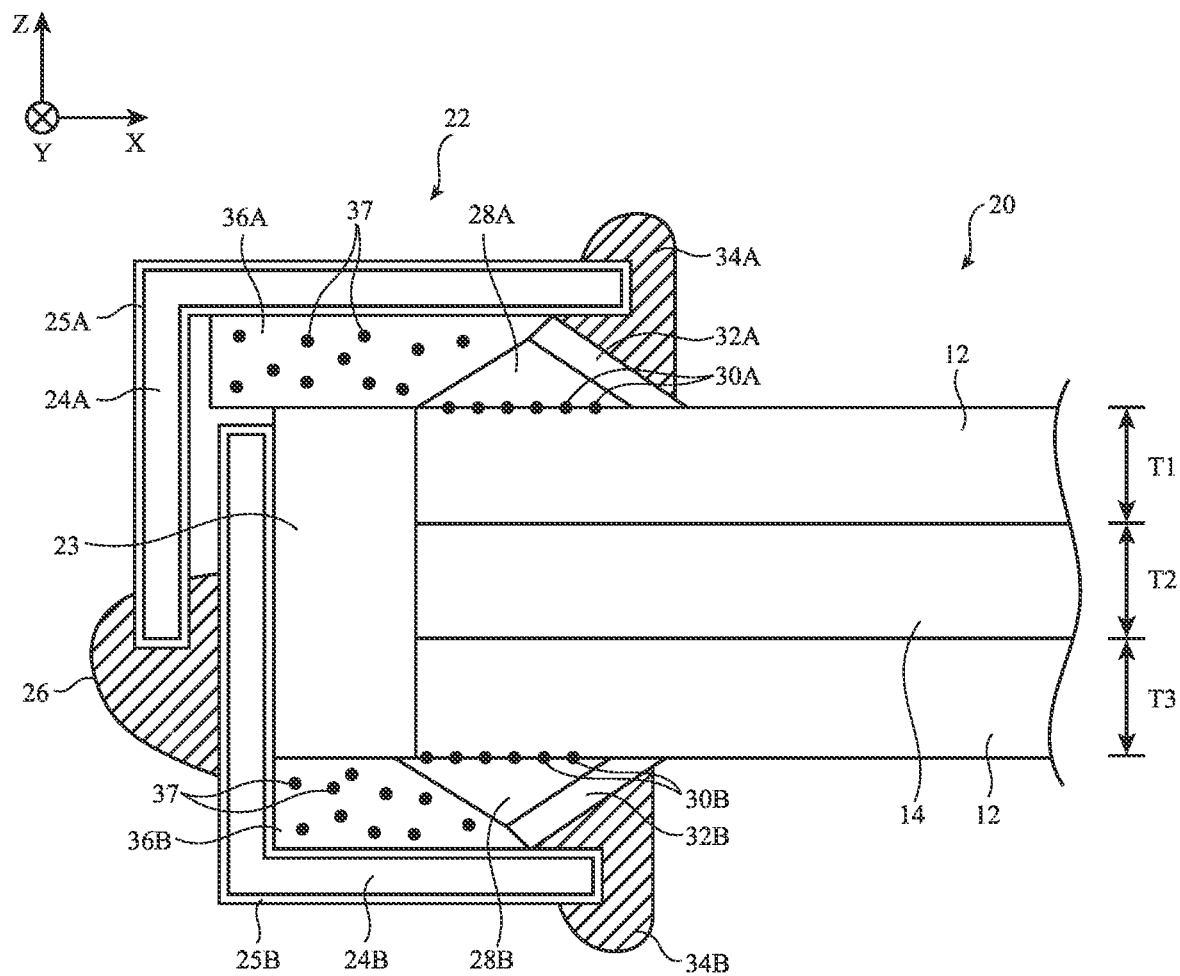
FIG. 3 is a cross-sectional view of an illustrative peripheral seal having multiple metal layers coupled to prism rings on an optical component in accordance with some embodiments.

As shown in FIG. 3, optical component 20 may have first and second substrates 12. Polymer layer 14 may be formed between substrates 12. When left unprotected, moisture can enter polymer layer 14 at peripheral edge (e.g., the edge adjacent to layer 23) of component 20. To hermetically seal component 20 and thereby protect layer 14 from moisture ingress, seal 22 may be formed along the peripheral edge and may run around the entire periphery of component 20 as shown in FIG. 2.

In the example of FIG. 3, seal 22 includes an elastomeric buffer member such as buffer 23 that supports moisture barrier layer 24 (sometimes referred to as a hermetic barrier layer, environmental barrier layer, or barrier layer). Barrier layer 24 in the example of FIG. 3 includes a first portion formed from barrier layer 24A and a second portion formed from barrier layer 24B. Layers 24A and 24B are joined at bond 26 (e.g., using solder, laser welds or other welds, adhesive, and/or other bond mechanisms that bond the mated surfaces of layers 24A and 24B together). In some embodiments, bond 26 may be formed by soldering layers 24A and 24B together, such as by using laser jet welding. By attaching layers 24A and 24B together in this way, layers 24A and 24B form a unified moisture barrier layer for seal 22 (layer 24).

Layers 24A and 24B may be metal layers. For example, layers 24A and 24B may be metal foils, such as aluminum foil layers. In general, any desired metal, or other desired materials, such as polymer, may be used to form layers 24A and 24B. Moreover, layers 24A and 24B may be plated with plating 25A and 25B, which may be nickel and/or gold (e.g., through an electroless nickel immersion gold (ENIG) process), as examples. In one illustrative embodiment, layers 24A and 24B may be coated using an ENIG process with 1-3 microns of nickel and 50-70 nm of gold. In general, however, any desired thicknesses may be used.

Alternatively, layers 24A and 24B may be coated (e.g., plated or covered with foil) with a desired metal, such as nickel, gold, or silver, using any other desired process, such as cold rolling. In some embodiments, layers 24 may be plated with silver or gold that is between 20 and 50 microns thick. Alternatively, layers 24 may be coated with copper foil that is approximately 10 microns thick. However, these thicknesses and materials are merely illustrative. In general, layers 24A and 24B may be coated or plated with any desired material. By plating layers 24A and 24B, solder 26 may more effectively bond layers 24A and 24B, the plating may also be used to couple layers 24A and 24B to transparent layers 12, and the plating may protect layers 24A and 24B from damage during forming (e.g., stamping) during manufacturing. Plating 25A and 25B may be omitted, however, if desired.

To seal the peripheral edge of polymer layer 14, layer 24 may be bonded over the edge by attaching a first edge of layer 24 to a first of substrates 12, and by attaching an opposing second edge of layer 24 to a second of substrates 12. Moreover, to create a strong seal using a bond that does not damage substrates 12, glass prisms 28A and 28B may be coupled to layers 12. For example, glass prisms 28A and 28B may be welded (e.g., by glass-to-glass welding in embodiments in which layers 12 are formed from glass) to layers 12 via welds 30A and 30B, respectively. In general, however, glass prisms 28 may be coupled to substrates 12 in any desired manner.

Coupling glass prisms 28A and 28B to layers 12 may allow metal layers 32A and 32B to be formed on the glass prisms. For example, metal layers 32A and 32B may be sputtered onto the glass prisms, formed by any desired physical vapor deposition process on the glass prisms, or otherwise coupled to the glass prisms. Metal layers 32A and 32B may be formed from titanium, tin, nickel, gold, or other desired metal. Regardless of the method in which metal layers 32A and 32B are formed on glass prisms 28A and 28B and the material of metal layers 32, sealing/barrier layers 24A and 24B may be coupled to metal layers 32A and 32B, respectively. For example, as shown in FIG. 3, layers 24 may be soldered to metal 32 using bonds 34A and 34B (e.g., using laser solder jetting).

Desiccant material 36A and 36B may be interposed between glass prisms 28 and layers 24. For example, desiccant material 36 may be a UV curable or pressure sensitive adhesive that include desiccant particles 37 (e.g., particles suspended in a matrix) that may absorb any water that makes it past barrier 24 or prisms 28. In some embodiments, desiccant material 36 may be a desiccant tape. In this way, desiccant material 36 may provide additional protection of polymer layer 14 from moisture ingress.

Although bonds 26 and 34 have been described as being formed from solder, such as by a laser solder jetting process, bonds 26 and 34 may generally be formed from any desired bonding method. For example, bonds 26 and 34 may be formed by adhesive, solder, or other material for forming hermetically sealed joints. For example, bonds 26 and 34 may be formed using adhesives exhibiting low water vapor transmission rates such as polyisobutylene, epoxy, acrylic core tape, silver-based glue, fluorosilicones, or other adhesives, may be formed from metal solder based on indium-tin alloys or other metals, an/or may be formed by direct bonding in which the metal foil or other material of layer 24 is directly welded to the glass or other material of prisms 28. If desired, layer 24 may be formed from solder foil, allowing solder bonds to be formed directly between foil surfaces (e.g., for soldered foil-foil joints and soldered foil-glass bonds). In some configurations, metal layers (e.g., strips of metal running along the periphery of component 20) are formed on the surfaces of substrates 12 to help allow solder bonds to be formed (e.g., to enhanced solder adhesion to substrates 12).

The thicknesses T1 and T3 of substrates 12 may be equal or the values of T1 and T2 may be different from each other. Thicknesses T1 and T3 may have values of 50 microns to 1000 microns or 100 microns to 400 microns or other suitable substrate thicknesses may be used in forming substrates 12 for element 20 (e.g., T1 and/or T3 may be at least 50 microns, at least 200 microns, at least 250 microns, less than 1000 microns, less than 700 microns, less than 350 microns, etc.). The thickness T2 of polymer layer 14 may be 400 microns to 800 microns, at least 200 microns, at least 300 microns, at least 450 microns, less than 1200 microns, less than 750 microns, less than 600 microns, etc.

Layer 24 may be formed from a material such as metal foil (e.g., foil formed from aluminum, stainless steel, copper, nickel, and/or other metals), low water vapor transmission rate plastics such as polychlorotrifluoroethylene (PCTFE), or higher water vapor transmission rate plastics which are coated in a barrier film to reduce their water transmission, or other material(s) impermeable to moisture. The thickness of layer 24 may be less than 30 microns, 5-45 microns, at least 5 microns, at least 10 microns, at least 15 microns, at least 20 microns, at least 40 microns, less than 100 microns, less than 75 microns, less than 60 microns, or other suitable thickness. Layer 24 is preferably sufficiently thin to be bent into a desired shape for seal 22 while being sufficiently thick to exhibit desired strength while serving as a moisture barrier. Thinner foils tend to offer less resistance to thermal movement. Thicker foils tend to offer better handling and moisture barrier properties. Layer 24 preferably has a thickness and composition that allows layer 24 to be formed into a desired shape (e.g., under heat and/or pressure). As an example, layer 24 may have a thickness of less than 50 microns so that a desired three-dimensional shape may be embossed and/or otherwise molded (pressed) into layer 24.

Buffer 23, which may sometimes be referred to as a buffer member, support member, moisture barrier layer support, or support structure, may be formed from an elastomeric material or other compliant material. This allows buffer 23 to expand and contract to accommodate temperature-induced changes in the thickness of element 20 (e.g., the compliant nature of buffer 23 helps avoid stress due to possible mismatch between the coefficient of thermal expansion of each of the layers of element 20 and the coefficient of thermal expansion of buffer 23).

Examples of suitable materials for buffer 23 include silicone, polyisobutylene, polyvinylidene difluoride, neoprene, and nitril rubber. These materials may exhibit desirable properties such as an ability to match temperature-induced expansion in layer 14 (e.g., if the coefficient of thermal expansion of layer 14 is greater than 200 ppm/C, buffer 23 may exhibit an approximately matched coefficient of thermal expansion of 100-300 ppm/C), a low modulus of elasticity (e.g., less than 10 MPa), chemical compatibility with layer 14, low solubility to liquid components in layer 14, low water vapor transmission rate, satisfactory adhesion to the edge of component 20, minimal permanent deformation under applied stress (e.g., over a temperature range of −40 to 85C or other suitable temperature range), a glass transition temperature outside of the expected operating range of device 10 (e.g., a glass transition temperature of less than −40C or >85C in one illustrative configuration), and a black appearance or other optically opaque appearance (e.g., less than 0.5% reflectivity) to help suppress stray light. Buffer 23 may have any suitable cross-sectional shape.

Layers 24A and 24B of seal 22 may have the same shape and size (e.g., so that layer 24 is symmetrical about bond 26) or layers 24A and 24B may have different shapes and/or sizes (e.g., so that the shape of layer 24 is asymmetrical).

The lateral dimension (width in the X-axis of FIG. 3) of buffer 23 may be at least 400 microns, at least 800 microns, at least 1600 microns, less than 4000 microns, less than 2000 microns, less than 1100 microns, less than 550 microns, less than 350 microns, or other suitable width. The support that buffer 23 provides to layer 24 may help prevent damage to layer 24 during assembly and use of device 10. If desired, buffer 23 may be omitted (e.g., so that an air gap is present between the inner surface of layer 24 and the peripheral edge of element 20). This can ease assembly of the structure.

The portion of housing 18 that supports element 20 may be mounted over an edge portion of layer 24 and/or may support element 20 at a portion of element 20 that is not overlapped by layer 24.

Using a hermetic sealing arrangement of the type shown in FIG. 3 or other hermetic sealing arrangement, layer 14 may be hermetically sealed (e.g., the entrance of moisture including moist substances such as sunscreen and perspiration, and/or other environmental contaminants into layer 14 from the exterior region surrounding layer 14 may be blocked and/or the egress of mobile compounds—e.g., moisture and/or small molecules and/or other mobile species—from within layer 14 to the exterior region surrounding layer 14 may be blocked). This helps preserve the integrity of layer 14 and prevents the performance of layer 14 from degrading. For example, the hermetic sealing of layer 14 may help preserve structures in layer 14.

Optical performance can also be preserved by configuring the hermetic seal to preserve the shape of element 20 over a range of operating temperatures (e.g., by ensuring that the edge does not become overly compressed or expanded relative to the center of element 20 during temperature fluctuations. Consider, as an example, a scenario in which element 20 has planar layers 12 and 14 or other layers 12 and 14 that are characterized by a center thickness (e.g., a first thickness CT1 that is measured in center of element 20) and an edge thickness (e.g., a second thickness CT2 that is measured adjacent to the periphery of element 20). Optical performance can be maintained for element 20 by configuring the hermetic seal of element 20 so that the change in CT1 over a given temperature range does not differ too much from the change in CT2 over the same given temperature range.

With an illustrative configuration, buffer 23 is formed from a low modulus (less than 10 MPa, as an example) elastomeric polymer such as silicone that exhibits a coefficient of thermal expansion of 100-300 ppm/° C., layers 12 are glass layers, layer 14 is a polymer with thickness of about 600 microns and a lateral dimension of about 4-6 cm, prisms 28 are glass prisms, and layer 24 includes first and second L-shaped aluminum portions 24A and 24B (e.g., 10 micron thick foils of aluminum) plated with plating 25 (e.g., gold and/or nickel).

Although prisms 28 have been described as glass prisms, this is merely illustrative. In general, prisms 28 may be formed from any desired material, such as ceramic, sapphire, glass, polymer, or other desired material. Moreover, prisms 28 may have any desired shape. Examples of illustrative prisms 28 that may be used to couple layers 24 to substrates 12 are shown in FIGS. 4 and 5.

Figure 4:
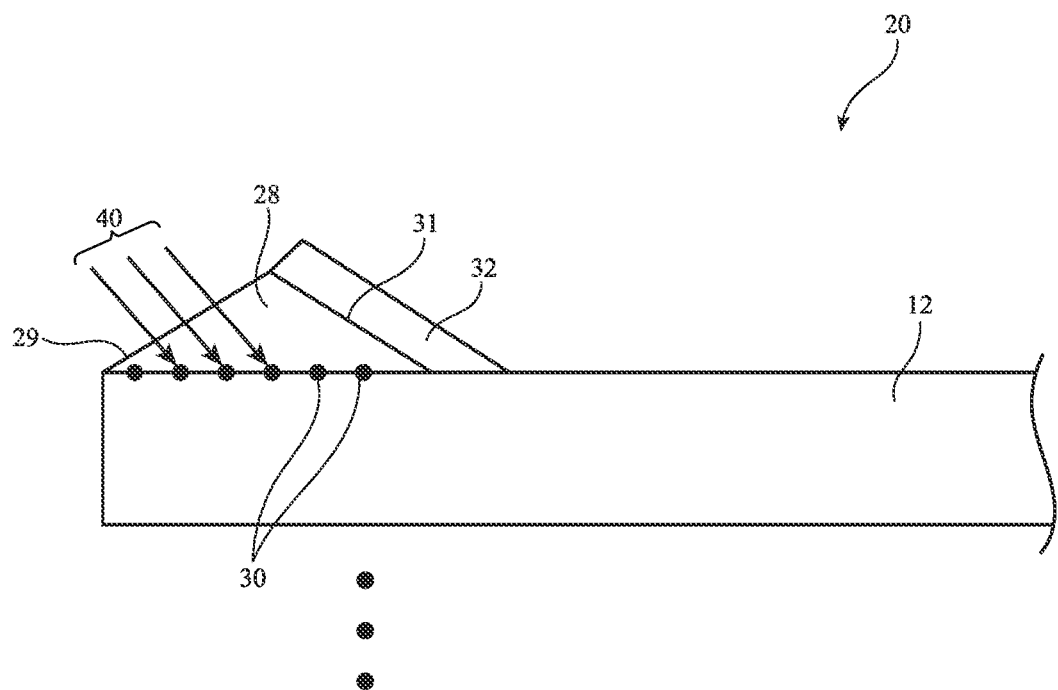
FIG. 4 is a cross-sectional view of an illustrative prism ring with a laser-welding window in accordance with some embodiments.

As shown in FIG. 4, prism 28 (which may correspond to either prism 28A or 28B of FIG. 3) is triangular. Metal 31 may be formed on first surface 31 of prism 28. Metal 31 may then be used to couple the seal (e.g., layers 24A and 24B) to substrate 12. A second surface of prism 28 may be coupled to substrate 12 using welds (or other bonds) 30. Third surface 29 may allow light (e.g., laser light) to pass when prism 28 is welded to substrate 12. In other words, third surface 29 may form a laser window. By forming prism 28 as a triangle having a large third surface 29, a large window may be provided to weld prism 28 to substrate 12. In some embodiments, however, it may not be necessary or otherwise desirable to have third surface 29 be large. Moreover, in general, any desired shape may be used to form prism 28. Some illustrative examples of various prisms that may be used are shown in FIGS. 5A-5E.

Figure 5A:
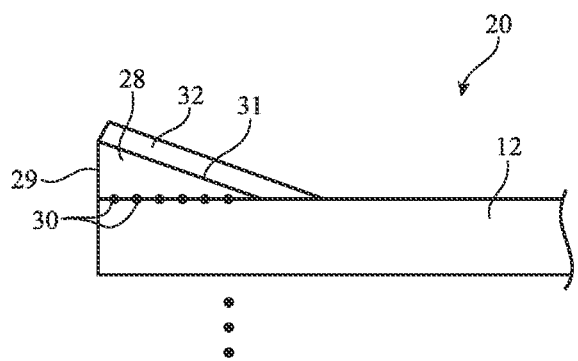
FIGS. 5A-5E are cross-sectional views of illustrative prism rings that may be used to attach a peripheral seal to an optical component in accordance with some embodiments.

As shown in FIG. 5A, third surface 29 may be vertical (or near-vertical). Although there will be a smaller window through which light may pass to weld prism 28 to substrate 12, first surface 31 may be longer, allowing for more metal 32 to be deposited. In this way, more metal may be provided for sealing layers 24 to bond.

Figure 5B:
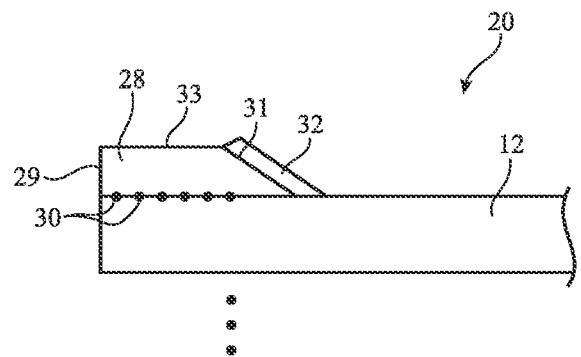

As shown in FIG. 5B, prism 28 may be trapezoidal, having planar upper surface 33, third surface 29, and surface 31 on which metal 32 is deposited. Planar upper surface 33 may form a laser window through which prism 28 is welded to substrate 12, if desired.

Figure 5C:
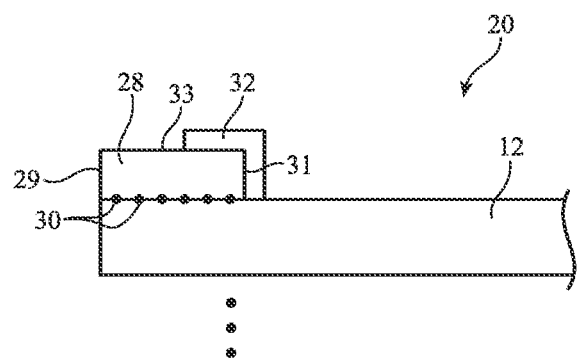
Figure 5D:
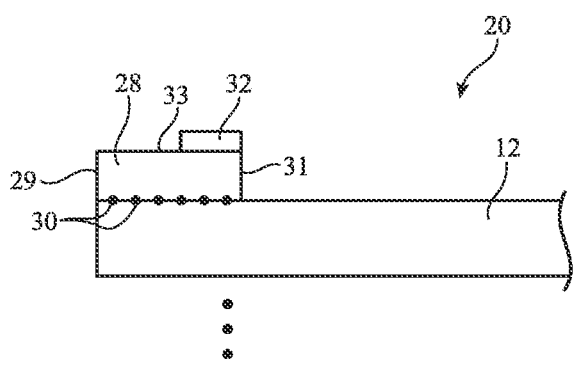

As shown in FIG. 5C, prism 28 may be rectangular, having planar upper surface 33 and side surfaces 29 and 31. Metal 32 may be deposited over side surface 31 and a portion of planar upper surface 33. The uncovered portion of planar upper surface 33 (e.g., the portion without metal 32) may form a laser window through which prism 28 is welded to substrate 12, if desired. As an alternative to having metal extend over side surface 31 and a portion of planar upper surface 33, metal 32 may extend only over a portion of upper surface 33, if desired, as shown in FIG. 5D.

Figure 5E:
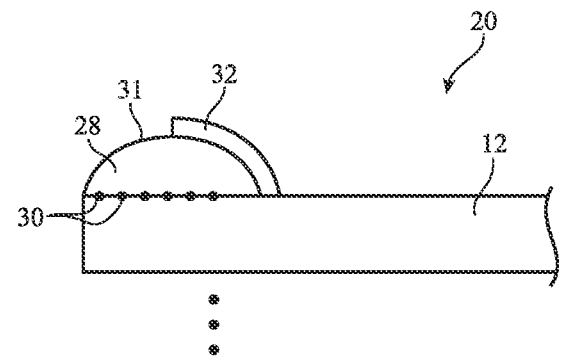

As shown in FIG. 5E, prism 28 may have a domes shape with surface 31. Metal layer 32 may be formed on surface 31. The uncovered portion of surface 31 (e.g., the portion without metal 32), may form a laser window through which prism 28 is welded to substrate 12, if desired.

The shapes of prisms 28 shown in FIGS. 4 and 5A-5E are merely illustrative. In general, prisms 28 may have any desired shapes.

Although FIG. 3 describe layers 24 as being two separate L-shaped layers, this is merely illustrative. In general, layers 24 may have any desired shapes, such as curved shapes. Alternatively or additionally, seal 22 may include any desired number of layers, such as one layer, two layers, or more than two layers. An illustrative embodiment in seal 22 includes a single layer is shown in FIG. 6.

Figure 6:
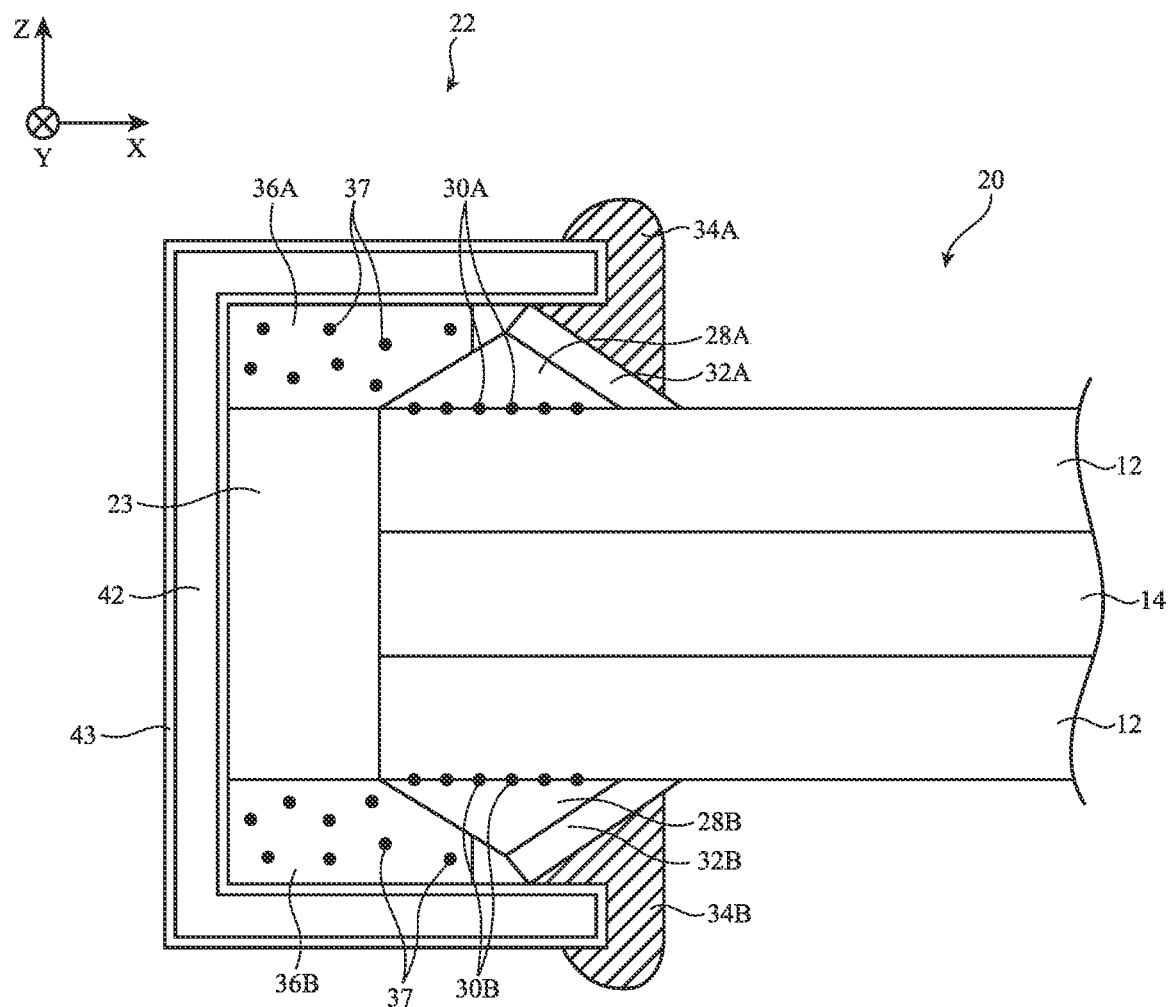
FIG. 6 is a cross-sectional view of an illustrative peripheral seal having a single metal layer coupled to prism rings on an optical component in accordance with some embodiments.

As shown in FIG. 6, seal 22 may include a single layer 42. Layer 42 may be, for example, a metal foil layer, or other metal layer. Layer 42 may be coupled to both upper and lower substrates 12. As shown in FIG. 6, an upper portion of layer 42 may be bonded (e.g., soldered) to metal 32A, while a lower portion of layer 42 is bonded (e.g., soldered) to metal 32B. Layer 42 may be plated, if desired, as indicated by plating 43. For example, plating 43 may be nickel and/or gold plating, such as ENIG plating. However, this is merely illustrative. Metal layer 42 may not be plated, if desired.

Although FIGS. 3-5 describe prisms 28 as having triangular shapes, this is merely illustrative. In general, prisms 28 may have any desired shapes, such as rectangular shapes, circular shapes, or other shapes. Alternatively, prisms 28 may be omitted (e.g., metal 32 may be formed directly on substrates 12). Illustrative embodiments in which prisms 28 are rectangular and omitted, respectively, are shown in FIGS. 7 and 8.

Figure 7:
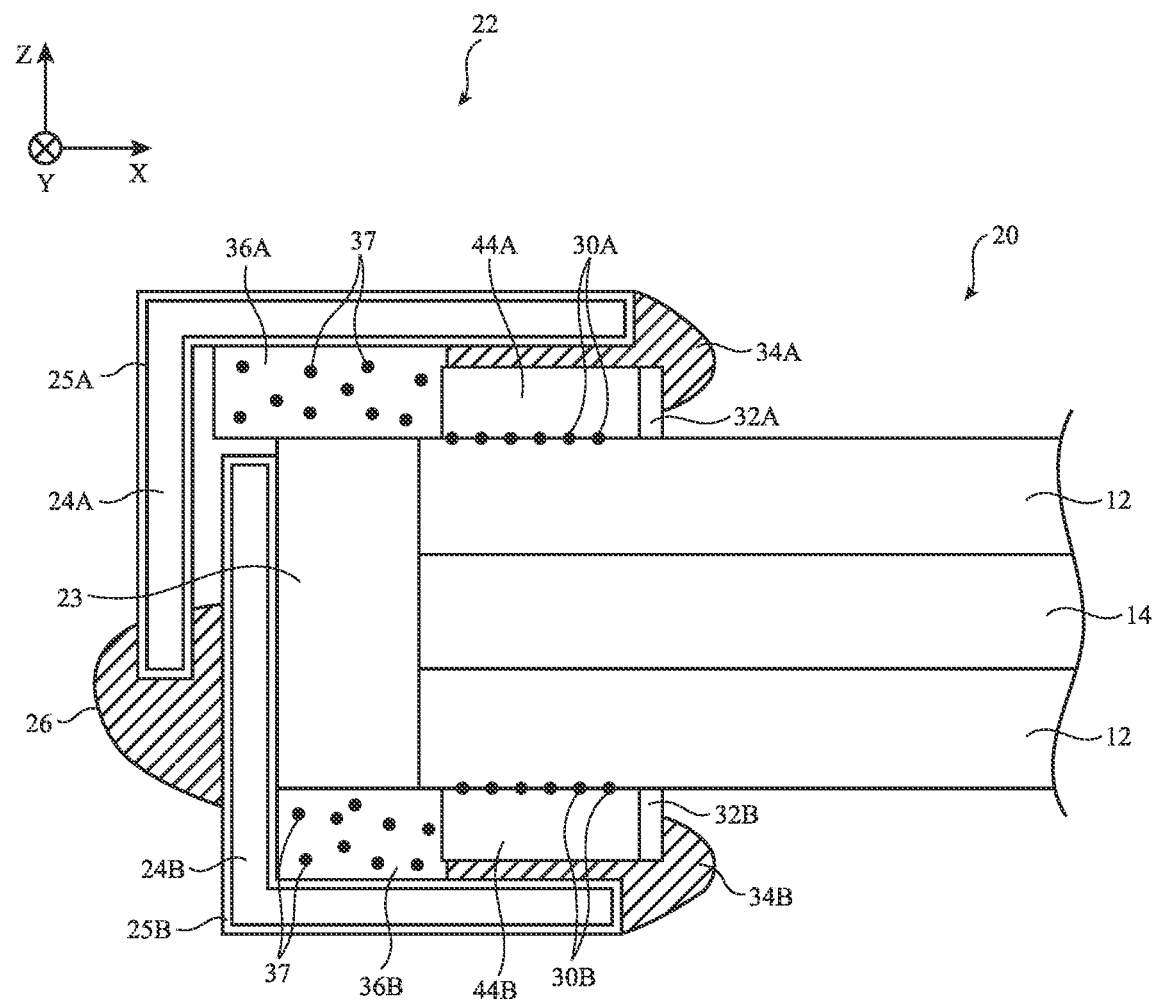
FIG. 7 is a cross-sectional view of an illustrative peripheral seal having multiple metal layers coupled to rectangular prism rings on an optical component in accordance with some embodiments.
Figure 8:
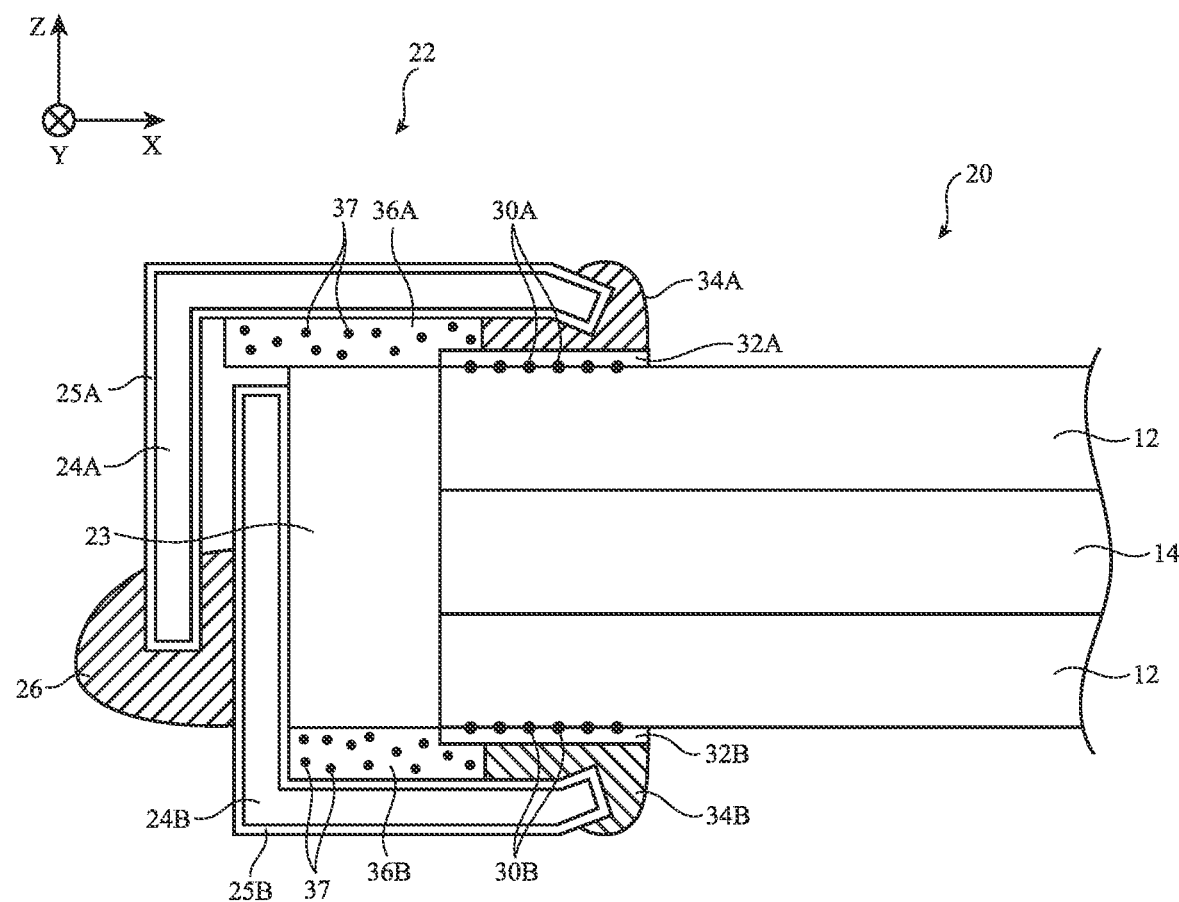
FIG. 8 is a cross-sectional view of an illustrative peripheral seal having multiple metal layers coupled to metal directly on an optical component in accordance with some embodiments.

As shown in FIG. 7, prisms 44A and 44B may be rectangular prisms and be coupled to substrates 12. For example, prisms 44A and 44B may be welded, adhesively bonded, or otherwise bonded to substrates 12 using bonds 30A and 30B, respectively. Prisms 44A and 44B may be formed from glass, ceramic, sapphire, polymer, or any other desired material.

Metal 32 may be formed on a surface of prisms 44. In one example, as shown in FIG. 7, metal 32A and 32B may be formed on side surfaces of prisms 44A and 44B, respectively. In general, however, metal 32 may be formed on one or more desired surfaces of prisms 44.

As discussed in connection with FIG. 3, layers 24A and 24B may be bonded to metal 32A and 32B using bonds 34A and 34B. Bonds 34A and 34B may be any desired bonds, such as solder (e.g., solder applied using laser solder jetting).

As shown in FIG. 8, prisms 28/44 may be omitted entirely, and metal 32A and 32B may be formed directly on upper and lower substrates 12, if desired. As shown in FIG. 8, metal 32A and 32B may be welded (e.g., laser welded) to substrates 12 with welds 30A and 30B, respectively. Alternatively, welds 30A and 30B may be omitted, and metal 32A and 32B may be sputtered onto substrates 12 (e.g., using a physical vapor deposition sputtering process) or printed on substrates 12 (e.g., using a metal particle printing or paste printing method). In general, metal 32 may be applied to substrates 12 using any desired method.

Layers 24A and 24B may then be bonded to metal 32A and 32B using bonds 34A and 34B. For example, layers 24A and 24B may be soldered to metal 32A and 32B using laser solder jetting, soldering indium tin (InSn) solder (or other desired solder) to layers 24 and metal 32, or other desired soldering process.

Whether or not prisms 28/44 are omitted, it may be desirable to include a dark peripheral member, such as an opaque masking layer, around the periphery of element 20. An illustrative example of such a peripheral member that may be incorporated into an optical component is shown in FIG. 9.

Figure 9:
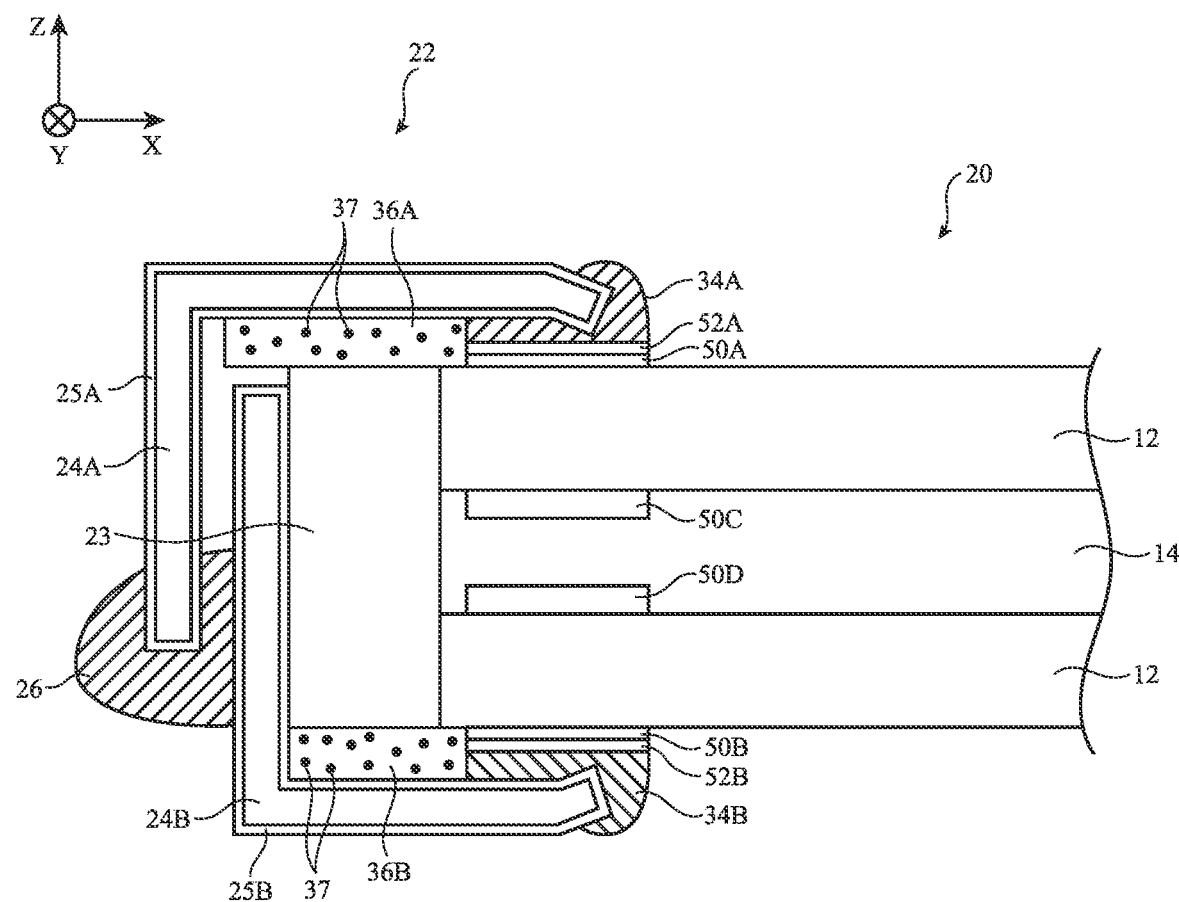
FIG. 9 is a cross-sectional view of an illustrative peripheral seal having dark deposition layers on an optical component in accordance with some embodiments.

As shown in FIG. 9, dark deposition layers 50A and 50C may be deposited on opposing sides of a first one of substrates 12 (e.g., upper substrate 12 in FIG. 9), and dark deposition layers 50B and 50D may be deposited on opposing sides of a second one of substrates 12 (e.g., lower substrate 12 in FIG. 9). Dark deposition layers 50A, 50B, 50C, and 50D, may be formed from amorphous silicon, may be formed from multiple layers (e.g., a first layer of Cr or CrC, and a second layer of W or WC), or may be formed from black nickel, as examples. In general, however, dark deposition layers 50A-D may be formed from any suitable opaque material.

Dark deposition layers 50A-D may have thicknesses of less than 1 micron, less than 1.5 microns, between 0.5 and 1 micron, or other suitable thicknesses. The presence of layers 50A-D may prevent light that enters the edge of element 20 from scattering within element 20. In other words, layers 50A-D may block stray light (e.g., absorb the stray light) that enters element 20 from scattering within element 20 and exiting element 20 as undesirable light.

Layers 52A and 52B may be formed on dark deposition layers 50A and 50B, respectively. Layers 52A and 52B may include metal layers, a layer of silicon oxide, or a low temperature oxide, as examples. Layers 52A and 52B may have thicknesses of less than 1 micron, less than 1.5 microns, between 0.5 and 1 micron, or other suitable thicknesses. Illustrative examples of layers that may be used as layer 52A and/or layer 52B in FIG. 9 are shown in FIGS. 10 and 11.

Figure 10:
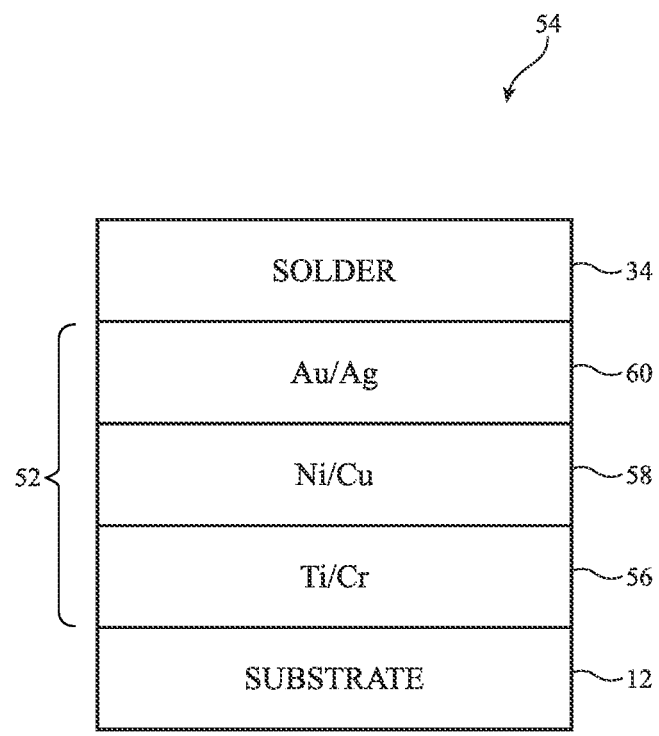
FIG. 10 is a side view of an illustrative metal layer that may be used in an optical component in accordance with some embodiments.
Figure 11:
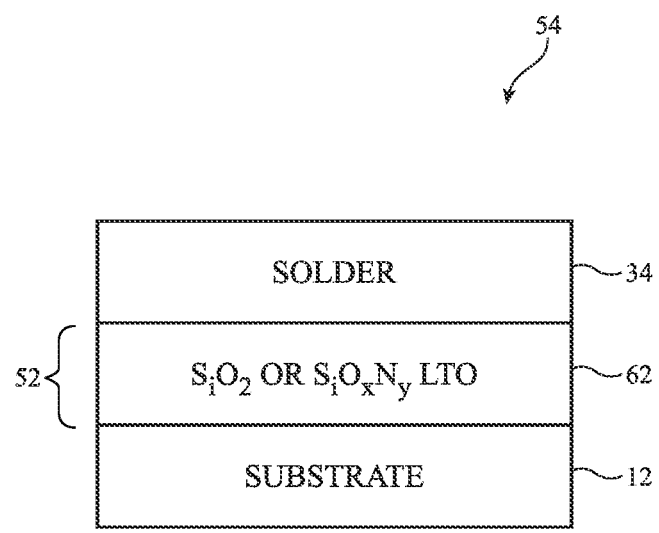
FIG. 11 is a side view of an illustrative low temperature oxide layer that may be used in an optical component in accordance with some embodiments.

As shown in FIG. 10, stack 54 may include substrate 12, solder 34, and layer 52 (which may correspond to one or both of layers 52A and/or 52B of FIG. 9) between substrate 12 and solder 34. Although not shown in FIG. 10, dark deposition layer 50A or 50B may be formed between layer 52 and substrate 12, if desired.

In the example of FIG. 10, layer 52 may include three metallic layers. In particular, layer 52 may include layer 56 formed from titanium and/or chromium, layer 58 formed from nickel and/or copper, and layer 60 formed from gold and/or silver.

Layer 52 may, in general, improve the adhesion of solder 34 to substrate 12. In particular, solder 34 may bond to metal better than to substrate 12 (e.g., if substrate 12 is glass, solder 34 may only be bonded to the glass using Van der Waahl's forces, whereas solder 34 may bond to layer 52 via stronger metallic bonding).

Layer 56 may be an adhesive layer of titanium and/or chromium and may have a thickness of less than 200 nm, less than 250 nm, between 100 and 200 nm, or other suitable thickness to adhere the other layers to substrate 12. The titanium, chromium, or other suitable material used for layer 56 may bond the material of substrate 12, such as glass, better than the other metal layers in layer 52 and solder 34. In some embodiments, the portion of substrate 12 in contact with layer 56 may be sanded to further improve the adhesion of layer 56 to substrate 12. In this way, layer 56 may improve the adhesion of layer 52 and solder 34 to substrate 12.

Layer 58 may be a layer to promote the adhesion of solder 34 and may be formed from nickel and/or copper with a thickness of less than 500 nm, less than 550 nm, between 400 and 500 nm, or other suitable thickness to adhere solder 34 to layer 52. Finally, layer 60 may be a layer that minimizes surface oxidation of layer 52 (e.g., by preventing moisture ingress onto substrate 12) and that allows fluxless soldering, and may be formed from silver or gold.

The materials discussed in connection with layers 56, 58, and 60 of layer 52 are merely illustrative. In general, any suitable layers, such as a stack of metal layers, may be used to improve the adhesion of solder 34 to substrate 12 and/or to protect substrate 12 from environmental conditions.

As an alternative to using metal layers 56, 58, and 60 to form layer 52, a low temperature oxide layer may be used. In the illustrative example of FIG. 11, layer 52 may be formed from silicon oxide or another suitable $SiO_xN_y$ low temperature oxide (LTO) 62. When applied to substrate 12 and/or a dark deposition layer (e.g., dark deposition layer 50), local defects may be formed on the O or N components of the LTO 62, which may create lone pairs that may covalently bond with the indium in solder 34 (e.g., InSn, InSnBi, or other indium-based solder). These bonds are stronger than bonds between solder 34 and substrate 12. In this way, LTO layer 62 may improve the adhesion between solder 34 and substrate 12.

Returning to FIG. 10, the presence of dark deposition layers 50A and 50B between substrates 12 and layers 52A and 52B may reduce stress on substrates when layers 52A and 52B are applied to substrates 12. In some embodiments, for example, dark deposition layers 50A and 50B may have greater thicknesses than dark deposition layers 50C and 50D to reduce the stress applied to substrates 12. However, this is merely illustrative. In some embodiments, dark deposition layers may be applied only on inner surfaces of substrates 12 (e.g., only dark deposition layers 50C and 50D may be present). In general, however, one or more dark deposition layer(s) may be formed on any suitable surface(s) of substrates 12.

Although the previous embodiments have shown layers 24 bonded to metal 32 or 52, this is merely illustrative. In some embodiments, metal 32 or 52 may be omitted. An illustrative embodiment in which metal 32 or 52 is omitted, and layers 24 are bonded to substrates 12 using desiccant tape and solder, is shown in FIG. 12.

Figure 12:
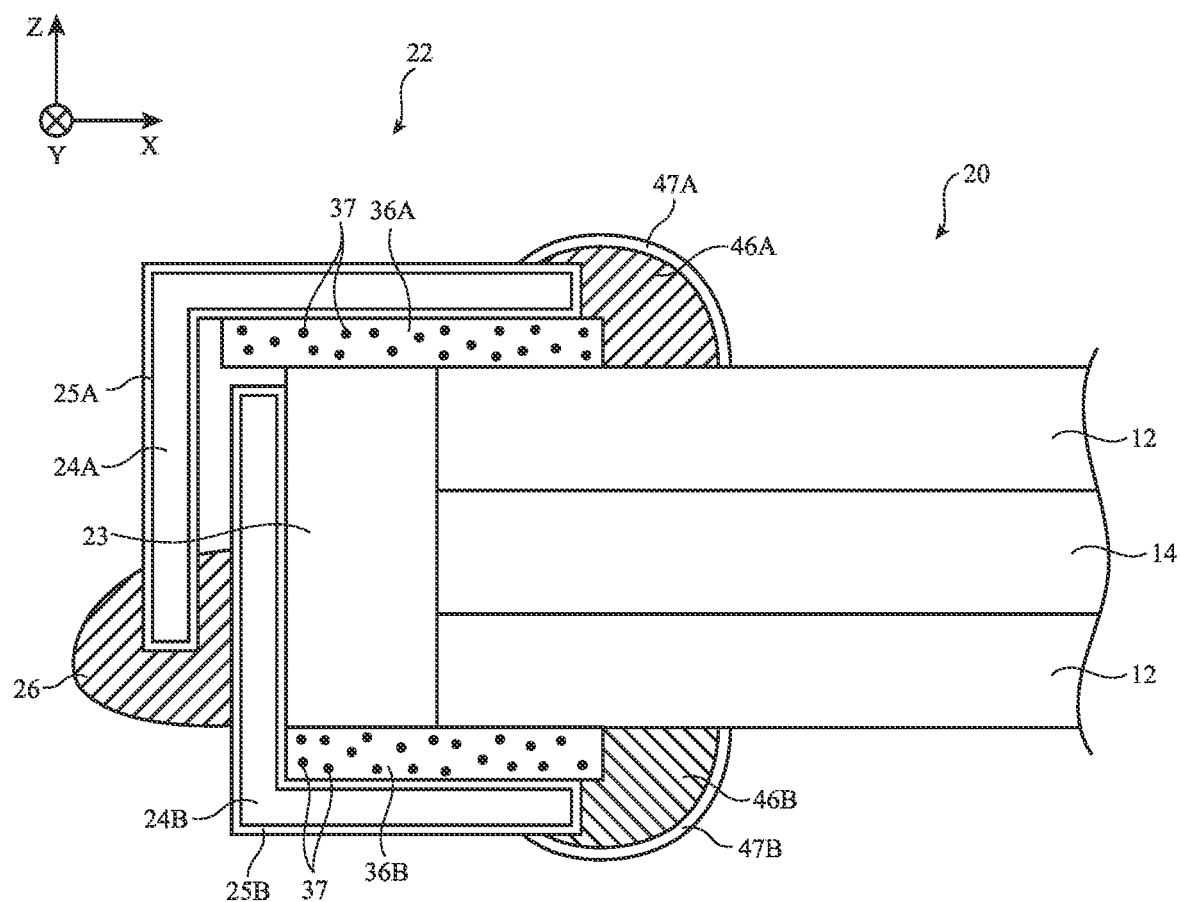
FIG. 12 is a cross-sectional view of an illustrative peripheral seal having multiple metal layers coupled to an optical component with desiccant tape in accordance with some embodiments.

As shown in FIG. 12, desiccant tape 36A and 36B may respectively couple layers 24A and 24B to substrates 12. In particular, desiccant tape 36 may have an inner surface that is applied to substrate 12 and an outer surface that is applied to layer 24. Moreover, solder 46, which may be indium tin solder or other desired solder, may be used solder layers 24 to substrates 12. If desired, glue 47 may be applied over solder 46.

While FIG. 12 shows solder 46 bonding layers 24 to substrates 12, solder 46 may be omitted, if desired. In some embodiments, therefore, desiccant tape 36 may bond layers 24 to substrates 12 without the use of additional bonding. Alternatively, bonds other than solder 46, such as bonds 34, may be used in bonding layers 24 to substrates 12.

Alternatively or additionally, layers 24 may be bonded to substrates using tape and primer. An illustrative example is shown in FIG. 13.

Figure 13:
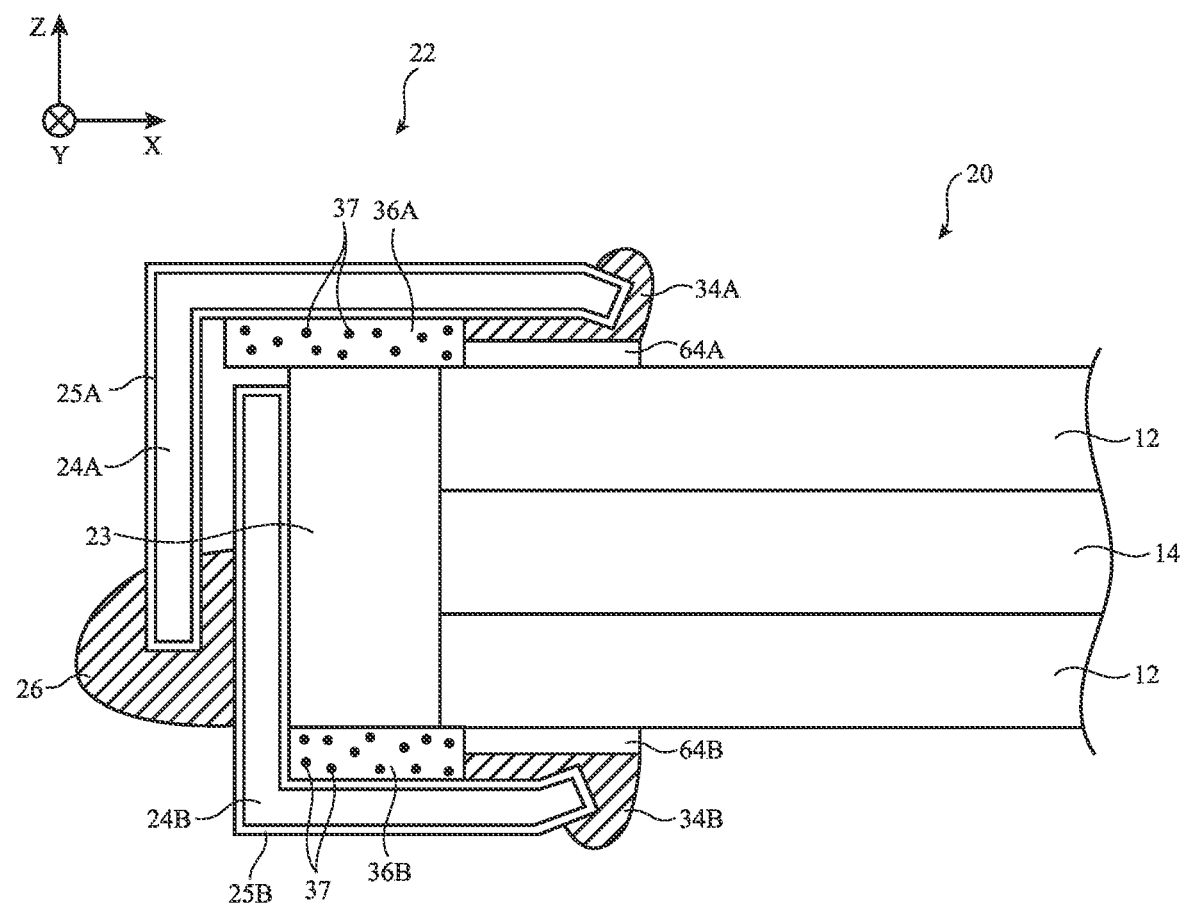
FIG. 13 is a cross-sectional side view of an illustrative peripheral seal having multiple metal layers coupled to an optical component using tape and a primer in accordance with some embodiments.

As shown in FIG. 13, tape 36A and 36B, which may be desiccant tape or other suitable tape may bond layers 24 to primer 64A and 64B. In the example of FIG. 13, layers 24 may be, for example, copper foil. For example, the copper foil may be pre-reduced by formic acid. The use of pre-reduced copper foil may improve the wetting, bonding, and sealing of solder 34. In general, however, any suitable material may be used to form layers 24. Plating 25 may be applied to layers 24, as shown in FIG. 13, or plating 25 may be omitted. In particular, if pre-reduced copper foil is used for layers 24, plating 25 may be omitted if desired.

Primer 64 may provide less stress to layers 12 than metal layers (such as metal layers 52 of FIG. 9). In general, any suitable primer may be used to form primer 64 and provide improved adhesion between layers 12, and tape 36/solder 34.

However, primer 64 and/or solder 34 may be omitted, if desired. As shown in illustrative FIG. 14, for example, layers 24 may be coupled to layers 12 with only tape 36. In particular, by omitting primer 64 and solder 34, layers 24 (which may be, for example, copper foil without plating 25) may be attached to layers 12 more easily.

Figure 14:
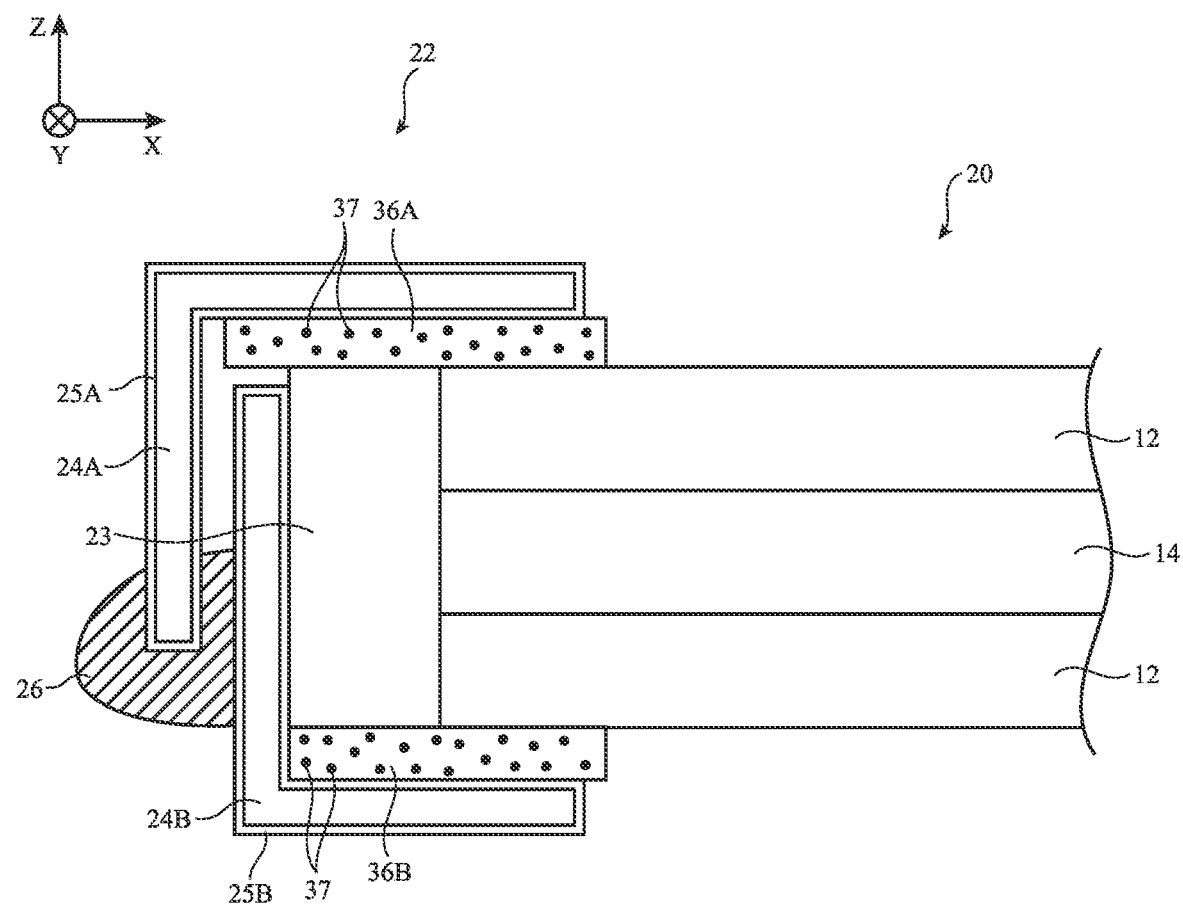
FIG. 14 is a cross-sectional side view of an illustrative peripheral seal having multiple metal layers coupled to an optical component using only tape in accordance with some embodiments.

Tape 36 may be desiccant tape (as shown in FIG. 14) and/or may be ultraviolet-curable and/or thermo-curable. The bold-line thickness of tape 36 may be less than 20 microns, less than 25 microns, less than 15 microns, or other suitable thickness. Moreover, tape 36 may have a bonding flowability of at least 20%, at least 25%, or at least 15%, as examples, and may have a modulus of elasticity of at least 10 MPa, at least 8 MPa, or other suitable modulus. By having a high flowability, defects may be minimized within tape 36, which in turn may minimize moisture ingress through tape 36 that could otherwise reach and damage layer 14. Additionally, tape 36 may have a high tensile and shear strength against a spring back force from layer 24, which may prevent/reduce delamination of tape 36 from layer 24 and/or buffer 23. Moreover, tape 36 may bond layers 24 to layers 12 while reducing defects that may otherwise occur in layers 12 from the stress applied by layers 24. In other words, tape 36 may reduce the stress that would otherwise be applied to layers 12 by layers 24. In this way, tape 36 may bond layers 24 to layers 12, while reducing risks of damage to layers 24, buffer 23, and/or layers 12.

Although layers 24 have been described as two separate layers, this is merely illustrative. In some embodiments, a single layer 24 may be applied to an edge of layers 12. An illustrative example is shown in FIG. 15.

Figure 15:
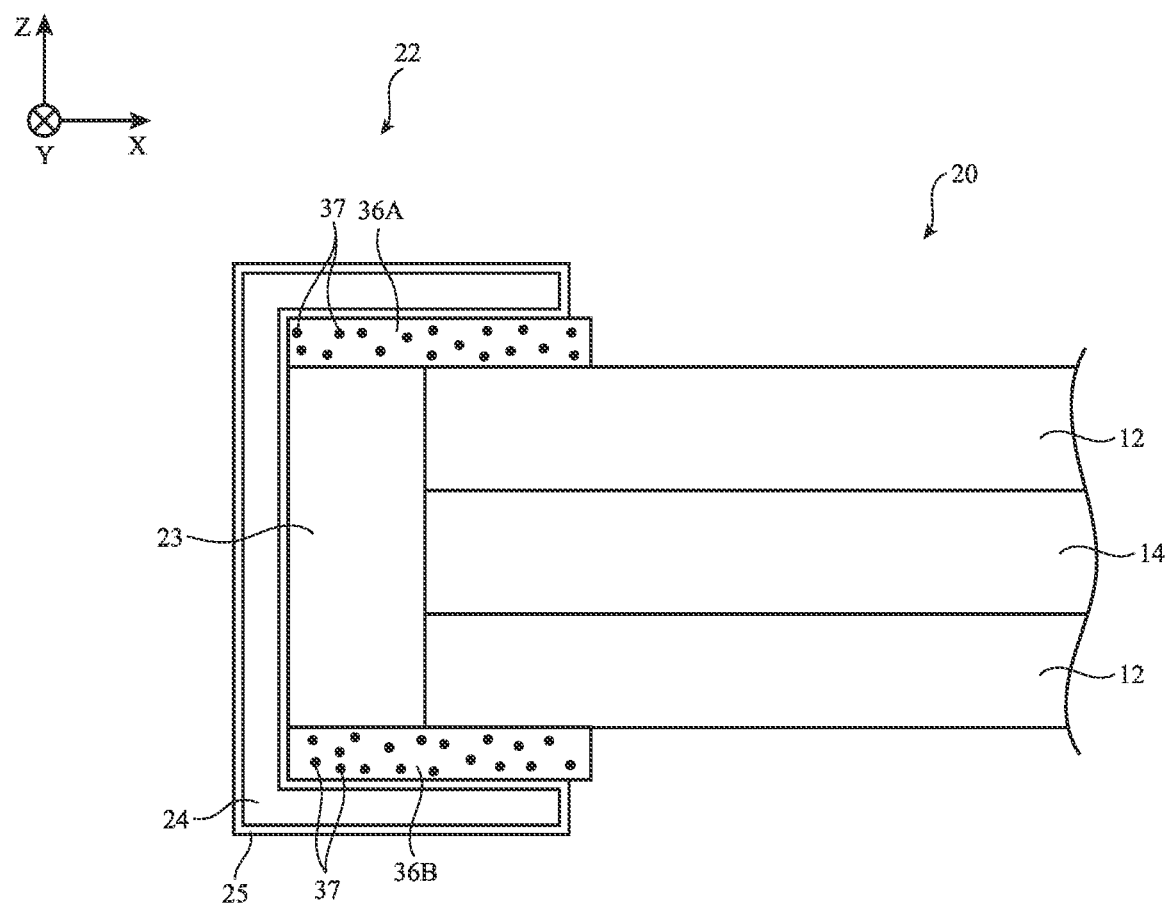
FIG. 15 is a cross-sectional side view of an illustrative seal having a single metal layer coupled to an optical component using tape in accordance with some embodiments.

As shown in FIG. 15, layer 24 may be applied to the edge of layers 12. Layer 24 of FIG. 15 may be a plated metal layer (e.g., a metal foil layer 24 plated with plating 25), may be a single layer of copper foil (or foil of another metal) without plating 25, or may be a soft metal foil (e.g., without plating 25), as examples. Suitable soft metal foils that may be used for layer 24 include tin (Sn), indium (In,) InSn, or SAC305 (e.g., a lead-free alloy that contains 96.5% tin, 3% silver, and 0.5% copper), as examples.

By forming layer 24 from a single layer, such as a single soft metal foil, the foil-to-foil seals may be reduced (e.g., the single layer may only need to be attached end-to-end at one portion along the periphery of layers 12). Moreover, the single soft metal foil may be repulsed from layers 12 less than multiple layers. In this way, a single soft metal foil layer (or other single layer) may be used to surround the edge of layers 12.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An optical component, comprising:
    first and second transparent layers;
    a polymer layer between the first and second transparent layers, wherein the polymer layer has a peripheral edge;
    first and second metal layers respectively adjacent to the first and second transparent layers; and
    a seal formed from a barrier layer that hermetically seals the peripheral edge, wherein the barrier layer is coupled to the first and second metal layers.

2. The optical component of claim 1, wherein the barrier layer comprises first and second L-shaped metal layers.

3. The optical component of claim 2, wherein the first and second L-shaped metal layers comprise plated aluminum.

4. The optical component of claim 2, wherein the first and second L-shaped metal layers have overlapping portions that overlap the peripheral edge, and wherein the overlapping portions are soldered.

5. The optical component of claim 1, wherein the first and second transparent layers are glass, the optical component further comprising:
    first and second glass prism rings respectively coupled to the first and second transparent layers.

6. The optical component of claim 5, wherein the first and second glass prism rings comprise first surfaces that are welded to the first and second transparent layers, the first and second glass prism rings comprise second surfaces, and the first and second metal layers are respectively formed on the second surfaces of the first and second glass prism rings.

7. The optical component of claim 6, wherein the barrier layer is soldered to the first and second metal layers.

8. The optical component of claim 6, further comprising:
    first and second portions of desiccant material respectively interposed between the first and second glass prism rings and the barrier layer.

9. The optical component of claim 1, further comprising:
    a buffer layer interposed between the peripheral edge and the barrier layer.

10. The optical component of claim 9, wherein the buffer layer comprises a metal foil layer, and wherein the metal foil layer is plated with nickel and gold.

11. The optical component of claim 1, further comprising:
a first layer of dark deposition material interposed between the first transparent layer and the first metal layer; and
a second layer of dark deposition material interposed between the second transparent layer and the second metal layer.

12. The optical component of claim 11, wherein the first and second layers of dark deposition material comprise a material selected from the group consisting of: amorphous silicon, chromium, CrC, Tungsten, WC, and nickel.

13. The optical component of claim 11, wherein the first and second metal layers each comprises a first metal layer, a second metal layer, and a third metal layer, wherein the first metal layer is in contact with the first layer of dark deposition material or the second layer of the dark deposition material, the optical component further comprising:
solder between the barrier layer and the third metal layers.

14. The optical component of claim 13, wherein the first metal layer comprises titanium or chromium, the second metal layer comprises nickel or copper, and the third metal layer comprises silver or gold.

15. An optical component, comprising:
a first glass layer comprising first and second opposing surfaces;
a second glass layer comprising third and fourth opposing surfaces;
a polymer layer coupled to the second and third surfaces;
a first glass prism ring coupled to the first surface;
a second glass prism ring coupled to the fourth surface; and
a seal formed along a peripheral edge of the polymer layer, wherein the seal includes a barrier layer that is coupled to the first glass prism ring and to the second glass prism ring.

16. The optical component of claim 15, further comprising:
first and second metal layers respectively formed on the first and second glass prism rings, wherein the barrier layer is soldered to the first and second metal layers.

17. The optical component of claim 16, wherein the barrier layer comprises first and second L-shaped metal layers, the first L-shaped metal layer is soldered to the first metal layer, the second L-shaped metal layer is soldered to the second metal layer, and the first and second L-shaped metal layers are soldered together.

18. The optical component of claim 17, wherein the first and second glass prism rings are welded to the first and fourth surfaces.

19. The optical component of claim 18, wherein the first and second glass prism rings are triangular prism rings having first, second, and third sides, wherein the first and second metal layers are sputtered onto the first sides of the first and second glass prism rings, and wherein the second sides are welded to the first and fourth surfaces.

20. The optical component of claim 19, wherein the third sides of the first and second glass prism rings form laser-welding windows.

21. The optical component of claim 17, wherein the first and second L-shaped metal layers comprise nickel-and-gold-plated metal foils.

22. The optical component of claim 17, wherein the first and second L-shaped metal layers have thicknesses of less than 30 microns.

23. An electronic device, comprising:
a support structure;
an optical component supported by the support structure, wherein the optical component has first and second glass layers, and has a polymer layer between the first and second glass layers; and
a hermetic seal formed along a peripheral edge of the optical component, wherein the hermetic seal comprises:
first and second glass prism layers respectively formed on the first and second glass layers;
third and fourth metal layers respectively formed on the first and second glass prism layers;
a first metal layer soldered to the third metal layer; and
a second metal layer soldered to the fourth metal layer.

24. The electronic device of claim 23, wherein the first and second metal layers are soldered together, and wherein the first and second glass prism layers are respectively welded to the first and second glass layers.

25. An optical component, comprising:
first and second transparent layers;
a polymer layer between the first and second transparent layers, wherein the polymer layer has a peripheral edge;
desiccant tape adjacent to the first and second transparent layers; and
a seal formed from a barrier layer that hermetically seals the peripheral edge, wherein the barrier layer is coupled to the first and second transparent layers with the desiccant tape.

26. The optical component of claim 25, wherein the barrier layer comprises first and second metal layers that are respectively soldered to the first and second transparent layers.

27. The optical component of claim 26, wherein the barrier layer further comprises primer between the first and second metal layers and the first and second transparent layers.

28. The optical component of claim 27, wherein the first and second metal layers comprise copper foil layers.

29. The optical component of claim 25, wherein the barrier layer comprises a single soft metal foil layer.

30. The optical component of claim 25, wherein the barrier layer comprises first and second metal layers that are respectively attached to the first and second transparent layers with only the desiccant tape.

* * * * *